(12) United States Patent
Herrington et al.

(10) Patent No.: US 11,861,576 B2
(45) Date of Patent: *Jan. 2, 2024

(54) SMART CARD WITH ACTIVE DIRECTIONAL INDICIA AND METHODS OF USE THEREOF

(71) Applicant: Capital One Services, LLC, McLean, VA (US)

(72) Inventors: Daniel Herrington, New York, NY (US); Stephen Robert Schneider, Midlothian, VA (US); Tyler Maiman, Melville, NY (US); Charles Moore, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,944

(22) Filed: Sep. 26, 2022

(65) Prior Publication Data

US 2023/0016372 A1    Jan. 19, 2023

Related U.S. Application Data

(63) Continuation of application No. 17/094,183, filed on Nov. 10, 2020, now Pat. No. 11,461,749.

(51) Int. Cl.
*G06Q 20/10* (2012.01)
*G06K 7/10* (2006.01)
*G06K 19/07* (2006.01)

(52) U.S. Cl.
CPC ..... *G06Q 20/1085* (2013.01); *G06K 7/10297* (2013.01); *G06K 19/0723* (2013.01)

(58) Field of Classification Search
CPC ........... G06Q 20/1085; G06K 7/10297; G06K 19/0723
See application file for complete search history.

(56) References Cited

U.S. PATENT DOCUMENTS

| | | | | |
|---|---|---|---|---|
| 9,978,010 | B2 * | 5/2018 | Cardinal | G06K 19/0704 |
| 2021/0365906 | A1 * | 11/2021 | Gupta | G06F 1/1643 |

FOREIGN PATENT DOCUMENTS

| | | | | |
|---|---|---|---|---|
| EP | 1807731 A1 * | 7/2007 | | G02F 1/133553 |
| EP | 1807731 A1 | 7/2007 | | |
| WO | WO-2016168398 A1 * | 10/2016 | | G06K 19/02 |

OTHER PUBLICATIONS

Ashokr: Smart Blinking ID Card, Web Archive, Sep. 23, 2020, p. 1 (Year: 2020).*

(Continued)

*Primary Examiner* — Bijendra K Shrestha
(74) *Attorney, Agent, or Firm* — Greenberg Traurig, LLP

(57) ABSTRACT

A smart card includes a plurality of display devices on an outside surface of a housing. Circuitry within the housing includes a processor, and communication circuitry configured to communicate with at least one computing device located within a geographic region around the smart card. The processor is configured to continuously receive a plurality of communication signals from the computing device, to continuously assess a geographic distance from the smart card to the fixed position of the computing device within the geographic region using the plurality of communication signals, to continuously activate or deactivate the plurality of display devices based on the geographic distance from the smart card to the fixed position of the computing device in the geographic region for providing a user with a directional indication, distance indication, or both, to the computing device in the geographic region.

20 Claims, 7 Drawing Sheets

(56) References Cited

OTHER PUBLICATIONS

Aslam et al.: A high precision heuristic model to detect home and location from smart card data, 2018, Geo-Spatial Information Science, pp. 1-12 (Year: 2018).*
Kanellos, M.: An LED ticker in your credit card? May 17, 2020, pp. 1-4 (Year: 2020).*
Kanellos, M.: An LED ticker in your credit card? May 17, 2020, p. 1-4 (Year: 2020).

* cited by examiner

SMART CARD WITH ACTIVE DIRECTIONAL INDICIA AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to smart cards, and more specifically to smart cards with active directional indicia.

BACKGROUND OF TECHNOLOGY

A smart card also known as a chip card, or an integrated circuit card, is a physical electronic authorization device which controls access to a resource. A smart card may include an embedded integrated circuit (IC) chip.

SUMMARY OF DESCRIBED SUBJECT MATTER

In some embodiments, the present disclosure provides an exemplary technically improved smart card may include: a housing; a plurality of display devices disposed on an outside surface of the housing; a circuitry disposed within the housing and may include: a driver circuitry may be configured to activate or deactivate each of the plurality of display devices; a non-transitory memory for storing computer code; a communication circuitry may be configured to communicate with at least one computing device located within a geographic region around the smart card; where the at least one computing device may be located at a fixed position within the geographic region and managed by an authorizing entity; a processor for executing the computer code, which configures the processor to: continuously receive a plurality of communication signals from the at least one computing device; continuously assess a geographic distance from the smart card to the fixed position of the at least one computing device within the geographic region using the plurality of communication signals; continuously activate or deactivate the plurality of display devices based on the geographic distance from the smart card to the fixed position of the at least one computing device in the geographic region so as to provide a directional indication, a distance indication, or both to the at least one computing device in the geographic region.

In some embodiments, the present disclosure provides an exemplary technically improved computer-based method that may include at least the following steps of continuously receiving, by a processor in a circuitry of a smart card, a plurality of communication signals from at least one computing device. The at least one computing device may be located at a fixed position within a geographic region around the smart card and managed by an authorizing entity. The smart card may include a housing, a plurality of display devices disposed on an outside surface of the housing, and the circuitry disposed within the housing. A geographic distance from the smart card to the fixed position of the at least one computing device within the geographic region may be continuously assessed by the processor using the plurality of communication signals. The plurality of display devices may be continuously activated or deactivated, by the processor, based on the geographic distance from the smart card to the fixed position of the at least one computing device in the geographic region so as to provide a directional indication, a distance indication, or both to the at least one computing device in the geographic region.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
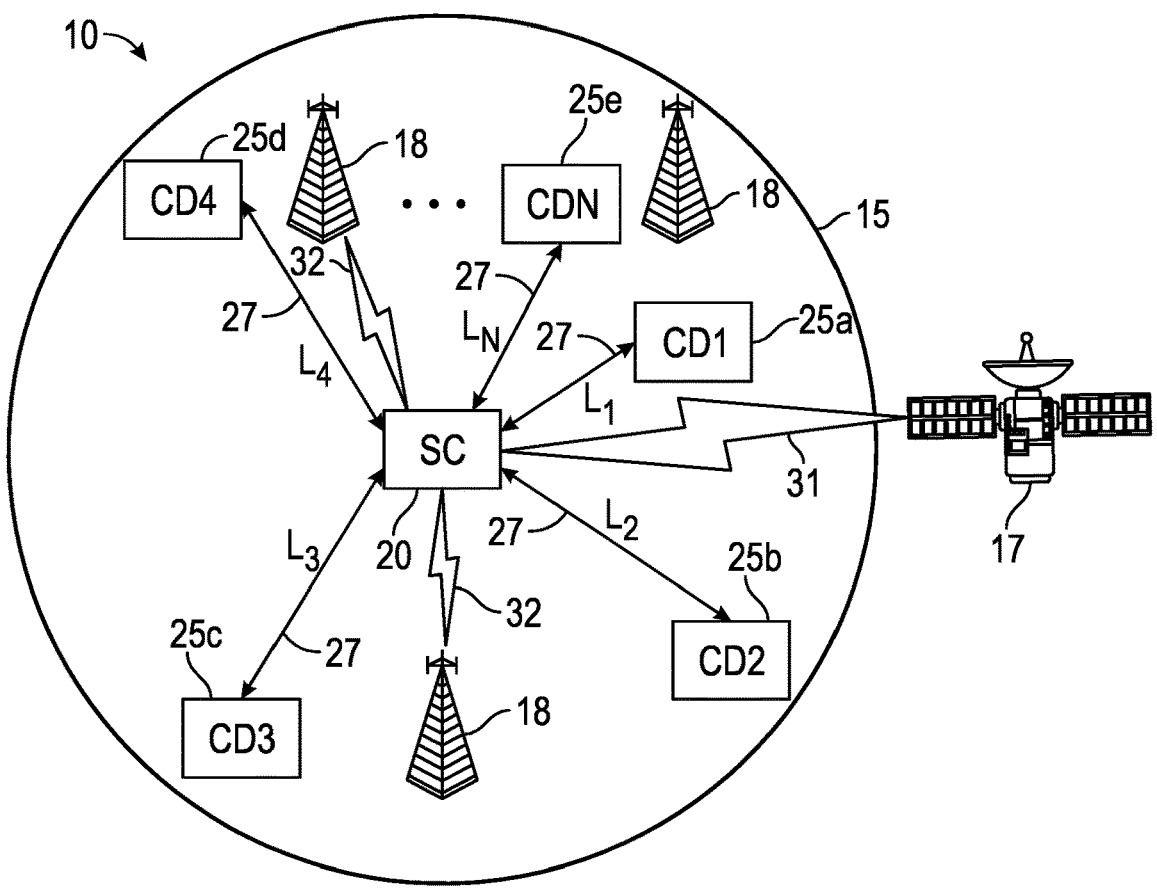
FIG. 1 depicts a system for managing smart cards with active directional indicia in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure describe systems and methods for managing smart cards with active directional indicia such as, without limitation, for guiding a user to a geographical point of interest. The smart card may be issued by an authorizing entity, such as a financial institution. A user may wish to find a point of interest affiliated with the authorizing entity, such as a bank branch, an automatic teller machine, a café managed by authorizing entity, for example, within a geographic area with which the user is unfamiliar. The embodiments disclosed herein provides a technical solution to this problem where the smart card is configured with circuitry that identifies points of interest affiliated with the authorizing entity and activates directional indicia on the smart card to guide the user to the identified points of interest within the geographic region. The directional indicia on the smart card may not only point the user in the direction of the points of interest affiliated with the authorizing entity but may also provide some distance indicia indicative of the distance from the smart card to the points of interest.

FIG. 1 depicts a system 10 for managing smart cards with active directional indicia in accordance with one or more embodiments of the present disclosure. System 10 may include a smart card (SC) 20 communicating 27 (e.g., sending/receiving a plurality of communication signals) with a plurality of computing devices 25a, 25b, 25c, 25d, and 25e, denoted respectively, CD1, CD2, CD3, CD4, . . . CDN where N is an integer. Each computing device 25 may be located at a fixed position within a geographic region 15, such as at a geographical point of interest affiliated with an authorizing entity. Each computing device, 25a to 25e, may be at a corresponding geographic distance from smart card 20 denoted L1, L2, L3, L4, . . . LN. Furthermore, the smart card 20 may be configured to communicate 31 with a global positioning system (GPS) such as a GPS satellite 17 and/or to communicate 32 with a cellular base station 18.

Figure 2:
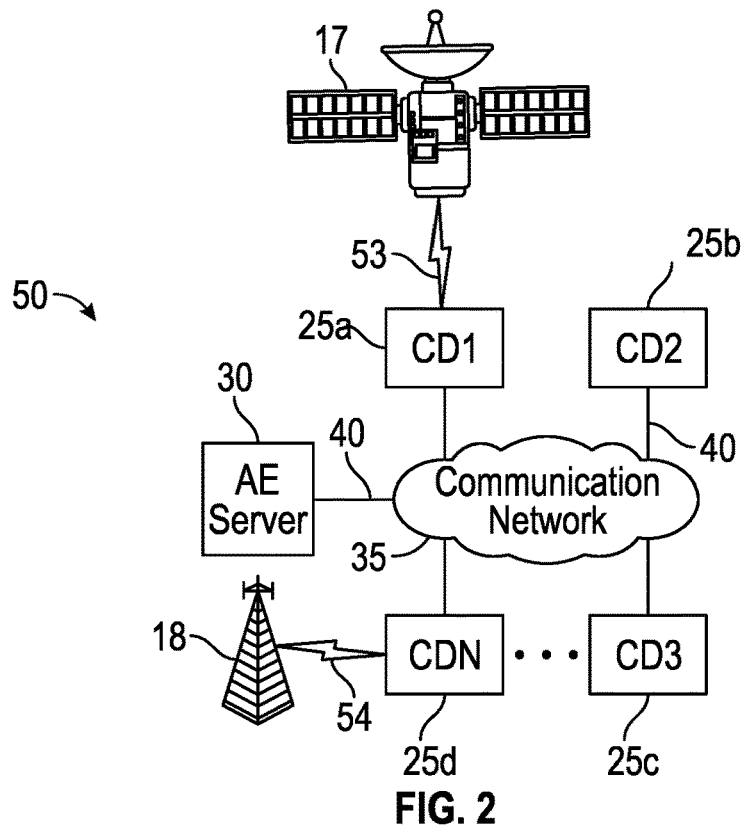
FIG. 2 depicts a system of a plurality of computing devices communicating with a server over a communication network in accordance with one or more embodiments of the present disclosure.

FIG. 2 depicts a system 50 of a plurality of computing devices 25a, 25b, 25c, and 25d, communicating 40 over a communication network 35 with a server 30 in accordance with one or more embodiments of the present disclosure. Server 30 also known as an authorizing entity (AE) server 30, which may be managed by an authorizing entity that issues a smart card 20 to the user. Furthermore, each computing device, 25a to 25d, may be configured to communicate 53 with the global positioning system (GPS) such as the GPS satellite 17 and/or communicate 54 with the cellular base station 18.

Figure 3:
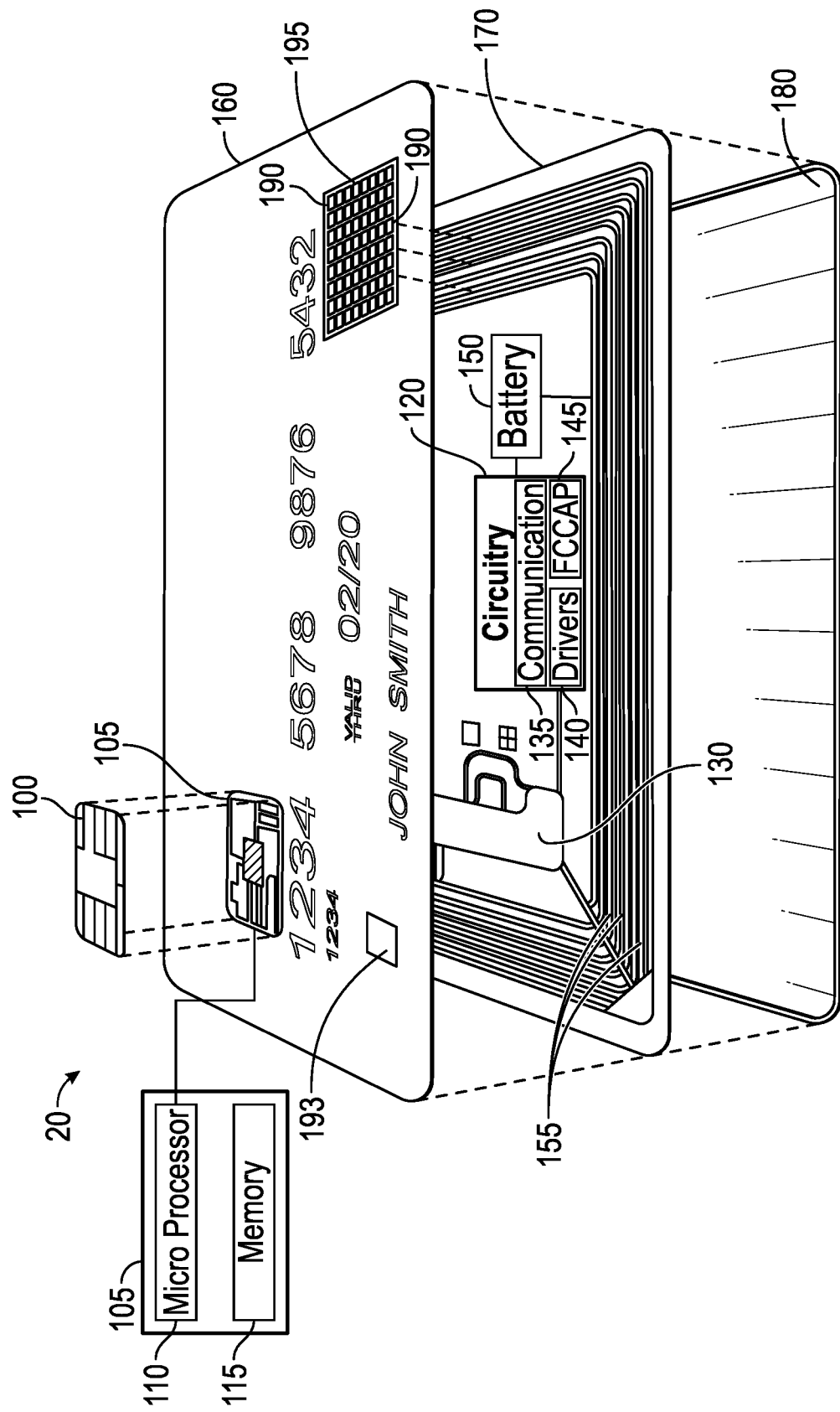
FIG. 3 depicts an exploded view of a smart card with active directional indicia in accordance with one or more embodiments of the present disclosure.

FIG. 3 depicts an exploded view of the smart card 20 with active directional indicia 190 in accordance with one or more embodiments of the present disclosure. The smart card 20 may be formed from plastic, such polyvinyl chloride, polyethylene-terephthalate-based polyesters, acrylonitrile butadiene styrene, polycarbonate, and/or any other suitable material. In some embodiments, the smart card 20 may be formed from multiple layers of plastics, and/or laminates, for example, but after assembly, the smart card may include housing 170 with a first outside surface 160 and a second outside surface 180 with circuitry 120 disposed within housing 170. Both the first outside surface 160 and/or the second outside surface 180 may be referred to as an outside surface of smart card 20.

In some embodiments, the smart card 20 may include a microchip 105 with a processor 110 and a memory 115 proximate to first outside surface 160. A contact pad 100 on the first outside surface 160 may be electrically coupled to the microchip 105 and interconnects 155 within housing 170. The interconnects 155 may route or meander in any suitable manner within the housing 170 to connect electrical elements in the circuitry 120 disposed within the housing 170.

In some embodiments, a plurality of display devices 190 may be disposed within a display device region 195 on the first outside surface 160 of the housing 170. The plurality of display devices 190 may include a plurality of light emitting diodes and/or a plurality of e-ink devices. Each of the plurality of display devices 190 may be circularly shaped and/or square-shaped. The interconnects 170 may connect the plurality of display devices 190 on the outside surface of the housing 170 of the smart card 20 to the circuitry 120 disposed within the housing 170.

In some embodiments, the circuitry 120 may include a communication circuitry 135, a driver circuitry 140 for driving each of the plurality of display devices 190, and a fast charging capacitor (FCCAP) 145 for storing power when the smart card 20 is coupled to at least one computing device, 25a to 25d, which charges the FCCAP 145. Communication circuitry 135 may enable the smart card 20 to communicate 27 by sending and/or receiving the plurality of communication signals via an antenna 130 to and/or from at least one computing device, 25a to 25d, to communicate 31 with the GPS 17, and/or to communicate 32 with the cellular base station 18 through Bluetooth, WiFi, global positioning system (GPS), near field communication (NFC) circuitry, and/or any other suitable communication networks, for example. The antenna 130 may be disposed within the housing 170. The communication circuitry may be configured to communicate with the at least one computing device, 25a to 25d, located in the geographic region around the smart card through the plurality of communication signals received and/or emitted from the antenna 130.

In some embodiments, the interconnects 155 may connect the circuitry 120 within the housing 170 to the contact pad 100. The contact pad 100 may have a contact area of approximately 1 square centimeter. The contact pad 100 may include several small contact pads. In other embodiments, the contact pad 100 may be gold-plated. The contact pad 100 may provide electrical connectivity when inserted into at least one computing device, 25a to 25d, such as a reader, or an automatic teller machine (ATM), for example. The contact pad 100 may be used to couple between smart card 20 and at least one computing device, 25a to 25d.

In some embodiments, the circuitry 120 may include any suitable power management circuitry for powering the electronic elements of the smart card 20, such as power circuitry for powering the circuitry 120. In other embodiments, the power circuitry may include a battery 150 for powering the circuitry 120.

In some embodiments, an alert indicator lamp 193 using a light emitting diode, and/or an e-ink device may be used to alert the user that the at least one computing device 25 may be safe from any fraudulent devices or malicious code for intercepting personal data of the user on smart card 20. Thus, the smart card 20 may safely communicate with the at least one computing device 25 for performing transactions such as by swiping the smart card 20 through a reader, inserting the smart card 20 into a slot of the reader, and/or using the NFC circuitry to couple the smart card 20 to the at least one computing device.

In some embodiments, processor 110 may continuously receive a plurality of communication signals 27 from the at least one computing device 25. Processor 110 may continuously assess a geographic distance (e.g., L1, L2, . . . LN) from the smart card 20 to the fixed position of the at least one computing device 25a, 25b, 25c, 25d, 25e within the geographic region 15 using the plurality of communication signals 27. The processor 110 may continuously activate or deactivate the plurality of display devices 190 through the driver circuitry 140 based on the geographic distance from the smart card to the fixed position of the at least one computing device in the geographic region. The activation or deactivation of a portion of the plurality of display devices 190 may be used to create directional indicia and/or distance indicia to the at least one computing device 25 in the geographic region 15.

In some embodiments, the processor 110 may identify a nearest computing device from the at least one computing device such as the CD1 with the distance L1 to the smart card 20. The processor 110 may provide directional and/or distance indicia to the nearest computing device when multiple computing devices are detected in the geographic region 15.

FIGS. 4A-4D are exemplary embodiments of configurations of active directional indicia in accordance with one or more embodiments of the present disclosure.

Figure 4A:
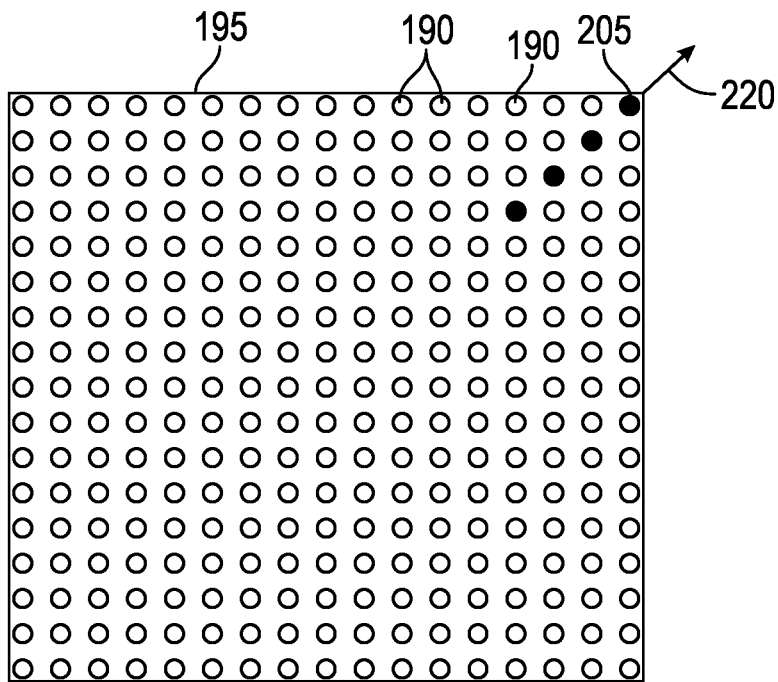
FIGS. 4A-4D are exemplary embodiments of configurations of active directional indicia in accordance with one or more embodiments of the present disclosure.
Figure 4B:
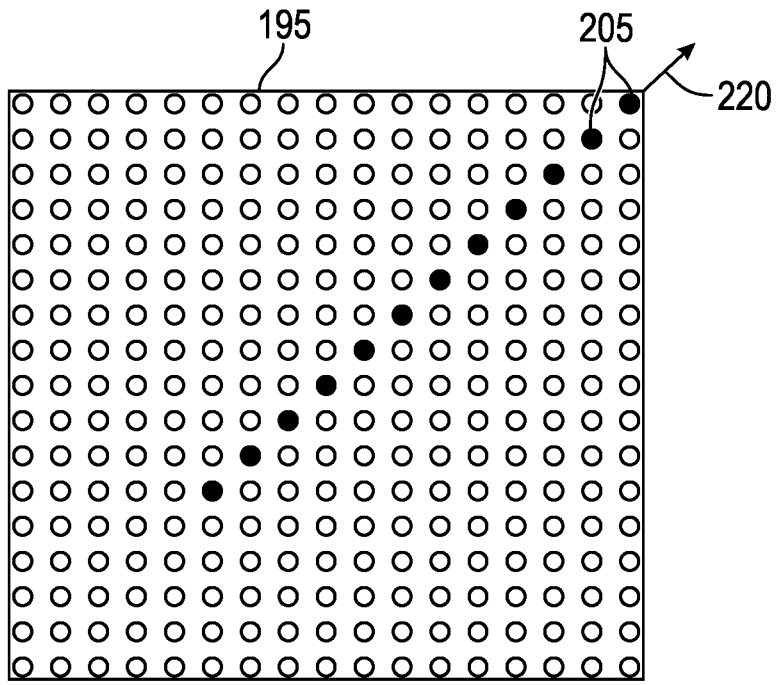

In some embodiments, FIG. 4A may include the display device region 195 populated by one or more circular-shaped display devices 190. When the processor 110 detects that one computing device from the at least one computing device may be in a direction shown by an arrow 220, the processor 110 may cause the driver circuitry 140 to activate a portion of the plurality of display devices such as four circular display devices 205 in the direction of the arrow 220. As the user gets closer to the one computing device, the processor 110 may cause the driver circuitry 140 to activate a larger portion of the plurality of display devices or more circular display devices 205 as shown in FIG. 4B such that a longer line of activated circular display devices 205 pointing in the direction of the arrow 220 indicates that the user is very close to the one computing device (e.g., one of devices 25a to 25d of FIG. 2).

Figure 4C:
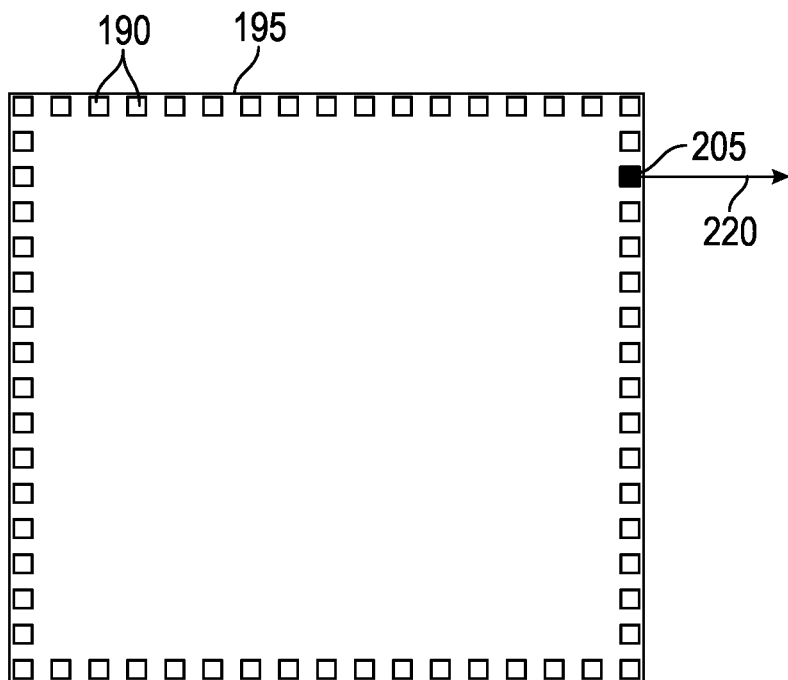

FIG. 4C has the display device region 195 that is square-shaped of display devices 190. Similarly, FIG. 4D has the display device region 195 that is circular-shaped of display devices 190. The processor 110 may cause the driver circuitry 140 to activate one display device 205 from the plurality of display devices 190 to indicate that the one computing device from the at least one computing device may be in a direction shown by the activated display device 205 (e.g., with the arrow 220).

In some embodiments, when the user gets closer to the one computing device from the at least one computing device in direction indicated by the activated display device 205, the processor 110 may cause the driver circuitry 140 to cause the activated display device 205 to blink with a blinking rate inversely proportional to the geographic distance (e.g., L1, L2, . . . LN) between the one computing device and the smart card 20.

Figure 4D:
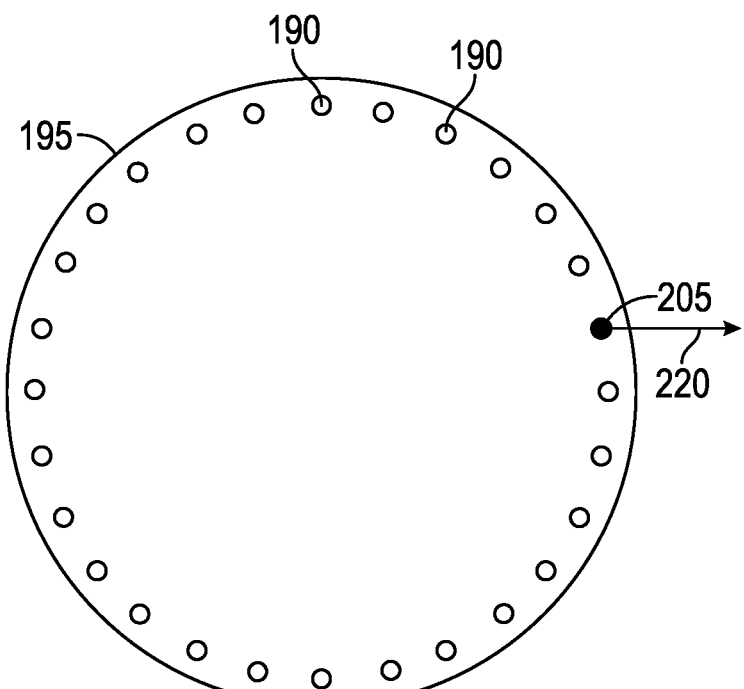
Figure 5A:
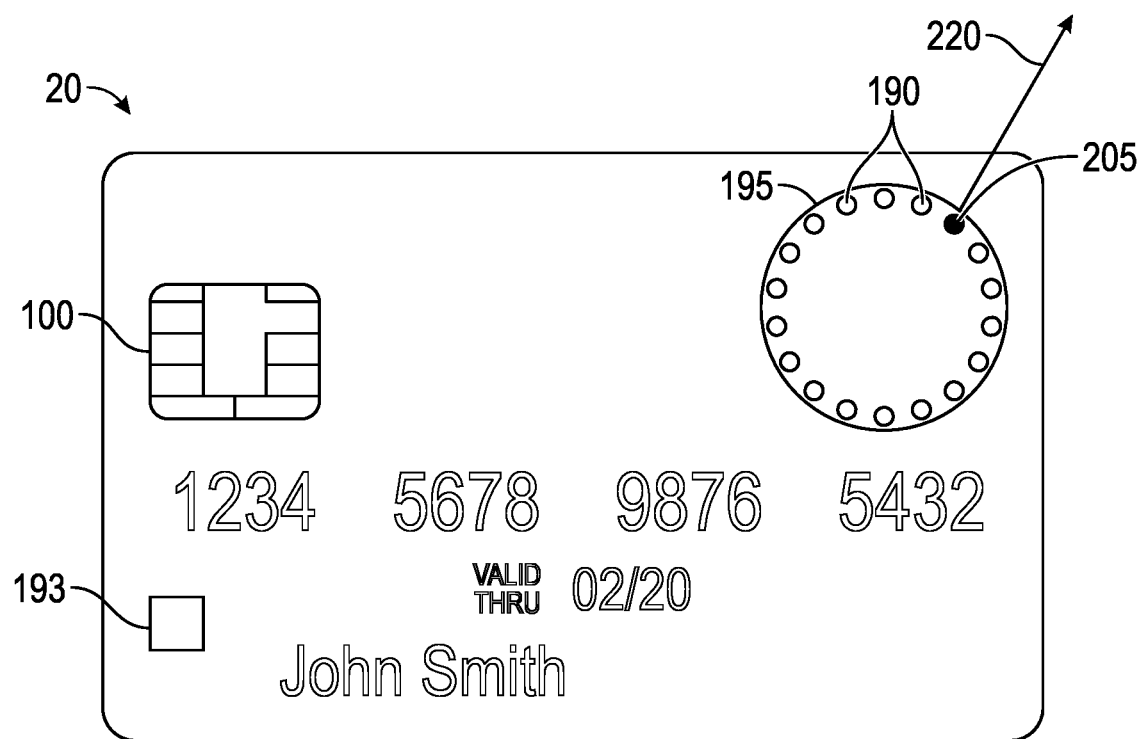
FIGS. 5A-5B are exemplary embodiments of a smart card with active directional indicia in accordance with one or more embodiments of the present disclosure.
Figure 5B:
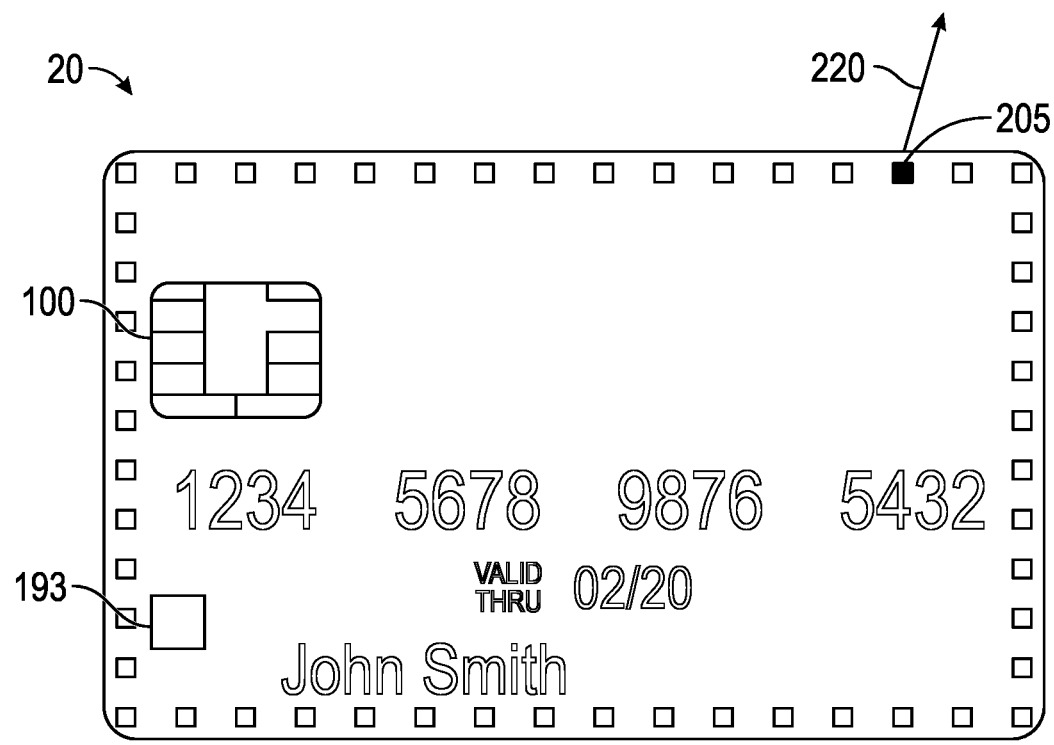

FIGS. 5A-5B are exemplary embodiments of a smart card with active directional indicia in accordance with one or more embodiments of the present disclosure. FIG. 5A shows the display device region 195 that is circular-shaped with the plurality of display devices 190 as shown in FIG. 4D on the first outside surface 160 of the housing 170 of the smart card 20.

In some embodiments, the alert indicator lamp 193 when lit, may indicate to the user that the at least one computing device 25 may be safe from any fraudulent devices or malicious code for intercepting personal data of the user on the smart card 20. Hence, the smart card 20 may be safely swiped through a reader, inserted into a slot of the reader, and/or coupled to the at least one computing device 25 using NFC circuitry. In other embodiments, the alert indicator lamp 193 may light when the smart card 20 authenticated with the at least one computing device 25 such as by using NFC, for example.

Similarly, FIG. 5B shows an exemplary configuration of the plurality of display devices 190 disposed along the edges of the housing 170 of the smart card 20 (e.g., edge lighting). In other embodiments, plurality of display devices 190 such as LEDs may be embedded within the smart card 20. The processor 110 may cause the driver circuitry 140 to activate one display device 205 from the plurality of display devices 190 around the periphery to indicate that the one computing device from the at least one computing device may be in a direction shown by the activated display device 205 (e.g., in the direction of the arrow 220). In addition, the processor 110 may cause the driver circuitry 140 to cause the activated display device 205 to blink with a faster blinking rate as the user gets closer to the one computing device.

In some embodiments, the microchip 105 may include a pressure sensor, for example. When a user squeezes the microchip 105, the communication circuitry 135 may be activated. In other embodiments, when the user squeezes the microchip 105, the plurality of display devices 190 may toggle between providing directional and/or distance indicia to different computing devices from the at least one computing device detected within the geographical region 15.

In some embodiments, communication 27 between the smart card 20 and any of the at least computing devices 25 may occur through a cellular phone or smart phone of the user. Additionally, or optionally, the cellular phone or the smart phone of the user may be paired to smart card 20 that may be used to communicate with GPS 17 and/or cellular base stations 18 and to identify all computing devices from the at least computing devices 25 in the geographical region 15 including the closest automatic teller machine (ATM) managed by the authorizing entity.

In some embodiments, the communication circuitry 135 may include low energy Bluetooth protocols for communicating with any of the at least one computing device 25 in the geographical region 15.

In some embodiments, the communication circuitry 135 may detect a signal strength and/or power of low energy Bluetooth signal to determine the geographical distance L1, L2, . . . Ln between the at least one computing device 25 and the smart card 20. As the user gets closer to the at least one computing device 25, the signal strength and/or power of the communication signals increase, such as an increase in the low energy Bluetooth signal, for example.

In some embodiments, the processor 110 may identify a closest computing device from the at least one computing device 25 based on a signal strength of the plurality of communication signals 27 within the geographic region 15, where the closest computing device has the strongest signal.

In some embodiments, if the smart card 20 is a contactless card (e.g., without the contact pad 100), for example, the smart card 20 may be charged via the antenna 130. For the smart card 20 with the contact pad 100, the smart card 20 may be charged when coupled to the at least one computing device 25.

In some embodiments, the circuitry 120 may include sensors for solar charging and/or energy harvesting using the FCCAP 145 (e.g., fast charging capacitors, and/or ultracapacitors).

In some embodiments, the smart card 20 may include interconnects for electrically coupling the smart card 20 to the at least one computing device 25 when the smart card 20 is inserted into a slot in of the at least one computing device, for example.

In some embodiments, near field communication (NFC) circuitry may be disposed within the housing 170 and the alert indicator lamp 193 may be disposed on the outside surface of the housing 170. The authorizing entity may include a financial institution. The at least one computing device may include an automated teller machine (ATM) to perform transactions with the financial institution using the smart card. The NFC circuitry may be configured to communicate with the ATM.

In some embodiments, the processor 110 may be configured to receive from the NFC circuitry, an indication from the ATM that the ATM is safe for performing the transactions using the smart card 20 and to cause the alert indicator lamp 193 to light for notifying a user of the smart card 20 that the ATM is safe for inserting the smart card into a slot in the ATM.

In some embodiments, the smart card 20 may include the plurality of display devices 190 that are disposed on the outside surface of the housing 170 that are arranged in a circle, a square, a square matrix, or any combination thereof.

In some embodiments, smart card 20 may include a plurality of display devices 190 that are disposed on the outside surface of the housing and along the edges of the housing.

In some embodiments, the smart card 20 may include a plurality of display devices 190 that are embedded within the housing 170 and positioned along the edges of the housing 170.

In some embodiments, the smart card 20 may include the microchip 105 embedded in the housing. The microchip 105 may include the processor 110 and the memory 115. In other embodiments, the circuitry 120 may include the processor 110 and the memory 115.

Figure 6:
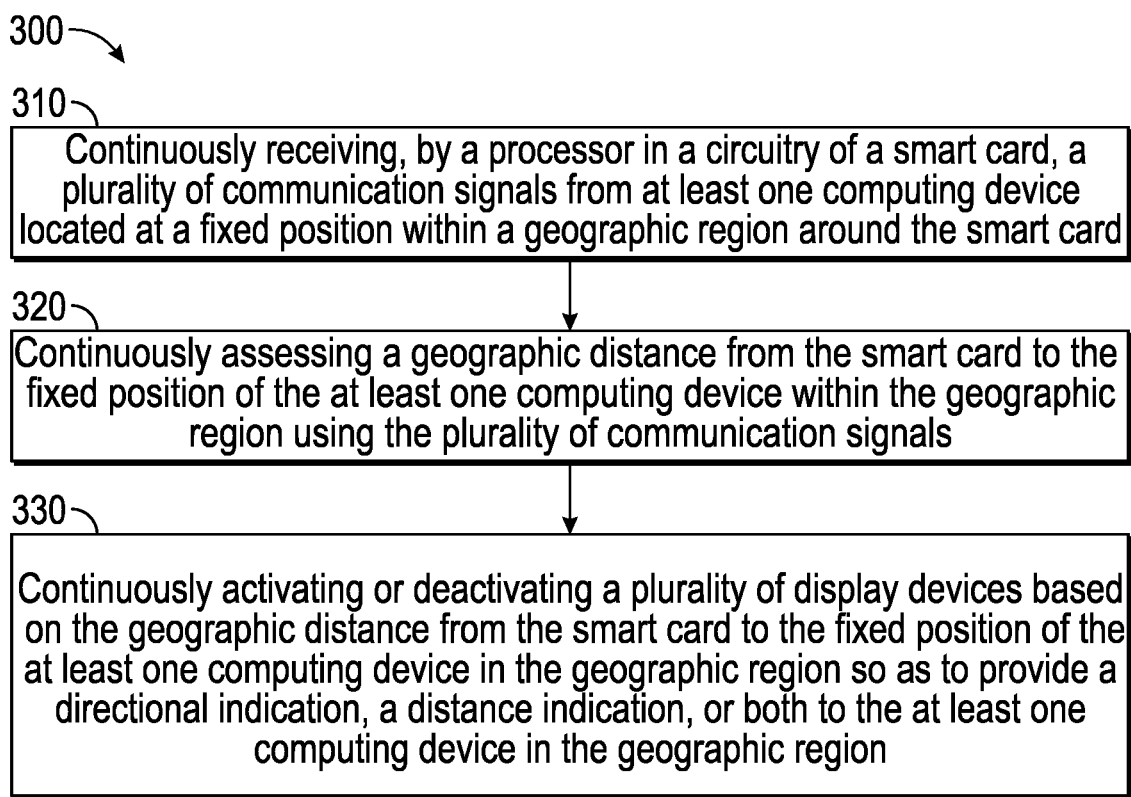
FIG. 6 is a flowchart of a method for managing smart cards with active directional indicia in accordance with one or more embodiments of the present disclosure.

FIG. 6 is a flowchart of a method 300 for managing smart cards with active directional indicia in accordance with one or more embodiments of the present disclosure. Method 300 may be performed by the processor 110.

In some embodiments, the microchip 105 may execute Java applications for performing all of the functions described herein and for performing the method 300.

Method 300 may include continuously receiving 310, by the processor 110 in the circuitry 120 of the smart card 20, a plurality of communication signals 27 from at least one computing device 25 located at a fixed position within the geographic region 15 around the smart card 20.

Method 300 may include continuously assessing 320 a geographic distance from the smart card to the fixed position of the at least one computing device within the geographic region using the plurality of communication signals.

Method 300 may include continuously activating or deactivating 330 the plurality of display devices 190 based on the geographic distance from the smart card to the fixed position of the at least one computing device in the geographic region so as to provide a directional indication, a distance indication, or both to the at least one computing device in the geographic region.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent smart cards of the present disclosure and/or users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display (e.g., the plurality of display devices 190) may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs). The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

1. A smart card may include:
   a housing;
   a plurality of display devices disposed on an outside surface of the housing;
   a circuitry disposed within the housing and may include:
     driver circuitry configured to activate or deactivate each of the plurality of display devices
     a non-transitory memory for storing computer code;
     a communication circuitry configured to communicate with at least one computing device located within a geographic region around the smart card;
     where the at least one computing device may be located at a fixed position within the geographic region and managed by an authorizing entity;

a processor for executing the computer code, which may configure the processor to:
continuously receive a plurality of communication signals from the at least one computing device;
continuously assess a geographic distance from the smart card to the fixed position of the at least one computing device within the geographic region using the plurality of communication signals;
continuously activate or deactivate the plurality of display devices based on the geographic distance from the smart card to the fixed position of the at least one computing device in the geographic region so as to provide a directional indication, a distance indication, or both to the at least one computing device in the geographic region.

2. The smart card according to clause 1, where the plurality of display devices may include a plurality of light emitting diodes, a plurality of e-ink devices, or both.

3. The smart card according to clause 1 or 2, where the directional indication may include directional indicia.

4. The smart card according to any one of the preceding clauses, where the directional indicia may be configured to blink with a blinking rate inversely proportional to the geographic distance from the at least one computing device in the geographic region.

5. The smart card according to any one of the preceding clauses, where the processor may be configured to identify the at least one computing device as a closest computing device based on a signal strength of the plurality of communication signals within the geographic region.

6. The smart card according to any one of the preceding clauses, where the circuitry may further include power circuitry for powering the circuitry.

7. The smart card according to any one of the preceding clauses, where the power circuitry may include a battery.

8. The smart card according to any one of the preceding clauses, where the power circuitry may include a fast charging capacitor for storing power.

9. The smart card according to any one of the preceding clauses may further include an antenna disposed within the housing, and where the communication circuitry may be configured to communicate with the at least one computing device in the geographic region through the antenna.

10. The smart card according to any one of the preceding clauses may further include an interconnect for electrically coupling the smart card to the at least one computing device.

11. The smart card according to any one of the preceding clauses may further include near field communication (NFC) circuitry disposed within the housing and an indicator lamp disposed on the outside surface of the housing;
where the authorizing entity may include a financial institution;
where the at least one computing device may be an automated teller machine (ATM) to perform transactions with the financial institution using the smart card; and
where the NFC circuitry may be configured to communicate with the ATM.

12. The smart card according to any one of the preceding clauses, where the processor may be configured to:
receive, from the NFC circuitry, an indication from the ATM that the ATM is safe for performing the transactions using the smart card; and
cause the indicator lamp to light for notifying a user of the smart card that the ATM is safe for inserting the smart card into a slot in the ATM.

13. The smart card according to any one of the preceding clauses, where the plurality of display devices disposed on the outside surface of the housing may be arranged in a circle, a square, a square matrix, or any combination thereof 14. The smart card according to any one of the preceding clauses, where the plurality of display devices on the outside surface of the housing may be disposed along edges of the housing.

15. The smart card according to any one of the preceding clauses may further include a microchip embedded within the housing, and where the microchip may include the processor of the circuitry.

16. A method may include:
continuously receiving, by a processor in a circuitry of a smart card, a plurality of communication signals from at least one computing device;
where the at least one computing device may be located at a fixed position within a geographic region around the smart card and managed by an authorizing entity;
where the smart card may include a housing, a plurality of display devices disposed on an outside surface of the housing; and the circuitry disposed within the housing;
continuously assessing, by the processor, a geographic distance from the smart card to the fixed position of the at least one computing device within the geographic region using the plurality of communication signals;
continuously activating or deactivating, by the processor, the plurality of display devices based on the geographic distance from the smart card to the fixed position of the at least one computing device in the geographic region so as to provide a directional indication, a distance indication, or both to the at least one computing device in the geographic region.

17. The method according to clause 16, where providing the directional indication may include displaying directional indicia.

18. The method according to clause 16 or 17, where providing the distance indication may include causing the directional indicia to blink with a blinking rate inversely proportional to the geographic distance from the at least one computing device in the geographic region.

19. The method according to any one of clauses 16, 17, or 18 may further include identifying, by the processor, the at least one computing device as a closest computing device in the geographic region based on a signal strength of the plurality of communication signals within the geographic region.

20. The method according to any one of clauses 16, 17, 18, or 19, where the authorizing entity may include a financial institution;
where the at least one computing device may be an automated teller machine (ATM) to perform transactions with the financial institution using the smart card; and may further include:
receiving, by the processor, an indication from the ATM that the ATM is safe for performing the transactions using the smart card; and
causing, by the processor, an indicator lamp on the smart card to light for notifying a user that the ATM is safe for inserting the smart card into a slot in the ATM.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A smart card comprising:
   a housing;
   a plurality of display devices disposed on an outside surface of the housing;
   a circuitry disposed within the housing and configured to:
   continuously assess a geographic distance from the smart card to a fixed position of at least one computing device within a geographic region around the smart card using a plurality of communication signals from the at least one computing device; and
   continuously activate or deactivate the plurality of display devices based on the geographic distance from the smart card to the fixed position of the at least one computing device in the geographic region and provide a directional indication, a distance indication, or both to the at least one computing device in the geographic region.

2. The smart card according to claim 1, wherein the plurality of display devices comprises a plurality of light emitting diodes, a plurality of e-ink devices, or both.

3. The smart card according to claim 1, wherein the plurality of display devices on the outside surface is arranged in a rectangular array, a circular array, a rectangle, or a circle to provide the directional indication, the distance indication, or both.

4. The smart card according to claim 1, wherein the directional indication comprises directional indicia.

5. The smart card according to claim 4, wherein the directional indicia is configured to blink with a blinking rate inversely proportional to the geographic distance from the at least one computing device in the geographic region.

6. The smart card according to claim 1, wherein the circuitry is configured to identify the at least one computing device as a closest computing device based on a signal strength of the plurality of communication signals within the geographic region.

7. The smart card according to claim 1, wherein the housing is formed from a material selected from a group consisting of plastic, polyvinyl chloride, polyethylene-terephthalate-based polyesters, acrylonitrile butadiene styrene, polycarbonate, multilayered plastics, and multilayered laminates.

8. The smart card according to claim 1, wherein the circuitry comprises a battery, a fast charging capacitor for storing power, or both.

9. The smart card according to claim 1, further comprising an antenna disposed within the housing, and wherein the circuitry is configured to communicate with the at least one computing device in the geographic region through the antenna.

10. The smart card according to claim 1, further comprising a contact pad disposed on the outside surface of the housing for electrically coupling the smart card to the at least one computing device.

11. The smart card according to claim 10, further comprising at least one interconnect within the housing for electrically coupling the at least one computing device to the circuitry.

12. The smart card according to claim 1, wherein the circuitry comprises a near field communication (NFC) circuitry disposed within the housing and an indicator lamp disposed on the outside surface of the housing;
   wherein the at least one computing device is an automated teller machine (ATM) to perform transactions with a financial institution using the smart card; and
   wherein the NFC circuitry is configured to communicate with the ATM.

13. The smart card according to claim 12, wherein the circuitry is configured to:
   receive, from the NFC circuitry, an indication from the ATM that the ATM is safe for performing the transactions using the smart card; and
   cause the indicator lamp to light for notifying a user of the smart card that the ATM is safe for inserting the smart card into a slot in the ATM.

14. The smart card according to claim 1, wherein the plurality of display devices on the outside surface of the housing are disposed along edges of the housing.

15. The smart card according to claim 1, wherein the circuitry comprises a processing microchip embedded within the housing.

16. A method, comprising:
   continuously assessing, by a circuitry of a smart card, a geographic distance from the smart card to a fixed position of at least one computing device within a geographic region around the smart card using a plurality of communication signals from the at least one computing device;
   wherein a plurality of display devices is disposed on an outside surface of the smart card; and
   continuously activating or deactivating, by the circuitry, the plurality of display devices based on the geographic distance from the smart card to the fixed position of the at least one computing device in the geographic region and provide a directional indication, a distance indication, or both, to the at least one computing device in the geographic region.

17. The method according to claim 16, wherein providing the directional indication comprises displaying directional indicia.

18. The method according to claim 17, wherein providing the distance indication comprises causing the directional indicia to blink with a blinking rate inversely proportional to the geographic distance from the at least one computing device in the geographic region.

19. The method according to claim 16, further comprising identifying, by the circuitry, the at least one computing device as a closest computing device in the geographic region based on a signal strength of the plurality of communication signals within the geographic region.

20. The method according to claim 16, wherein the at least one computing device is an automated teller machine (ATM) to perform transactions with a financial institution using the smart card; and further comprising:
   receiving, by the circuitry, an indication from the ATM that the ATM is safe for performing the transactions using the smart card; and
   causing, by the circuitry, an indicator lamp on the smart card to light for notifying a user that the ATM is safe for inserting the smart card into a slot in the ATM.

* * * * *